(12) United States Patent
Johnson, III et al.

(10) Patent No.: US 11,954,223 B2
(45) Date of Patent: Apr. 9, 2024

(54) DATA RECORD SEARCH WITH FIELD LEVEL USER ACCESS CONTROL

(71) Applicant: ServiceNow, Inc., Santa Clara, CA (US)

(72) Inventors: William Kimble Johnson, III, Natick, MA (US); Raymond Lau, Charlestown, MA (US); Benjamin Talcott Borchard, Somerville, MA (US)

(73) Assignee: ServiceNow, Inc., Santa Clara, CA (US)

( * ) Notice: Subject to any disclaimer, the term of this patent is extended or adjusted under 35 U.S.C. 154(b) by 778 days.

(21) Appl. No.: 17/068,542

(22) Filed: Oct. 12, 2020

(65) Prior Publication Data

US 2022/0114275 A1    Apr. 14, 2022

(51) Int. Cl.
*G06F 21/62*    (2013.01)
*G06F 16/22*    (2019.01)
*G06F 16/245*    (2019.01)

(52) U.S. Cl.
CPC ...... *G06F 21/6227* (2013.01); *G06F 16/2228* (2019.01); *G06F 16/245* (2019.01)

(58) Field of Classification Search
CPC ............. G06F 21/6227; G06F 16/2228; G06F 16/245; G06F 16/24547
See application file for complete search history.

(56) References Cited

U.S. PATENT DOCUMENTS

| | | | | |
|---|---|---|---|---|
| 6,243,713 | B1 * | 6/2001 | Nelson | G06F 16/40 704/235 |
| 7,433,893 | B2 * | 10/2008 | Lowry | G06F 16/316 |
| 7,765,215 | B2 * | 7/2010 | Hsu | G06F 16/328 707/742 |
| 8,131,744 | B2 * | 3/2012 | Dettinger | G06F 16/248 707/771 |
| 8,135,580 | B1 * | 3/2012 | Jin | G06F 40/247 704/7 |
| 9,129,007 | B2 * | 9/2015 | Lamanna | G06F 16/31 |
| 10,423,595 | B2 * | 9/2019 | Marquardt | G06F 16/243 |
| 2002/0035559 | A1 * | 3/2002 | Crowe | G06F 16/2228 |
| 2008/0086488 | A1 * | 4/2008 | Nomula | G06F 40/232 |

(Continued)

OTHER PUBLICATIONS

Author Unknown, Apache 2.0 licensed, Welcome to Apache Lucene, downloaded from https://web.archive.org/web/20201006005421/https://lucene.apache.org on Oct. 12, 2020, captured on Oct. 6, 2020.

(Continued)

*Primary Examiner* — Mohammed Waliullah
(74) *Attorney, Agent, or Firm* — Van Pelt, Yi & James LLP

(57) ABSTRACT

A search index is generated from one or more data records, wherein the one or more data records have contents in a plurality of different fields. Field information of the one or more data records is stored in the search index as specialized indexed elements, wherein the specialized indexed elements overlap with other indexed elements of the one or more data records. A search query is received from a user allowed to access only a portion of the plurality of different fields. The search query is processed within the portion of the plurality of different fields using the search index including the specialized indexed elements.

20 Claims, 7 Drawing Sheets

(56) References Cited

U.S. PATENT DOCUMENTS

| | | | |
|---|---|---|---|
| 2010/0005054 A1* | 1/2010 | Smith | G06F 16/2456 |
| | | | 707/E17.014 |
| 2010/0332515 A1* | 12/2010 | Carraher | G06F 16/951 |
| | | | 707/769 |
| 2012/0110085 A1* | 5/2012 | Malik | G06F 16/955 |
| | | | 709/205 |
| 2012/0117080 A1* | 5/2012 | Lamanna | G06F 16/31 |
| | | | 707/747 |
| 2012/0290592 A1* | 11/2012 | Ishii | G06F 16/256 |
| | | | 707/754 |
| 2014/0365527 A1* | 12/2014 | Fuchs | G06F 21/6227 |
| | | | 707/786 |
| 2016/0357809 A1* | 12/2016 | Patel | G06F 16/2471 |
| 2021/0319068 A1* | 10/2021 | Li | G06N 3/006 |

OTHER PUBLICATIONS

McCandless et al., "Lucene in Action, Second Edition: Covers Apache Lucene 3.0", Jul. 28, 2010, ISBN: 978-1933988177 *Book submitted*.

\* cited by examiner

DATA RECORD SEARCH WITH FIELD LEVEL USER ACCESS CONTROL

BACKGROUND OF THE INVENTION

Computer information retrieval systems are designed to assist in locating information stored on computer systems. Examples of computer systems include personal computers and computer networks. In many scenarios, a search, such as a text search, is performed to retrieve information located in data records. Typically, a user interface accepts requests for information stored in various data records and displays results returned by a search engine. Oftentimes, restrictions apply to which data records and substructures of the data records are allowed to be accessed in a search (e.g., restrictions based on the user performing the search and other factors). Applying access restrictions, also referred to herein as access control, to searches can be computationally burdensome. Thus, it would be beneficial to develop techniques directed toward providing improved access control while using computer information retrieval systems.

BRIEF DESCRIPTION OF THE DRAWINGS

Various embodiments of the invention are disclosed in the following detailed description and the accompanying drawings.

DETAILED DESCRIPTION

Figure 1:
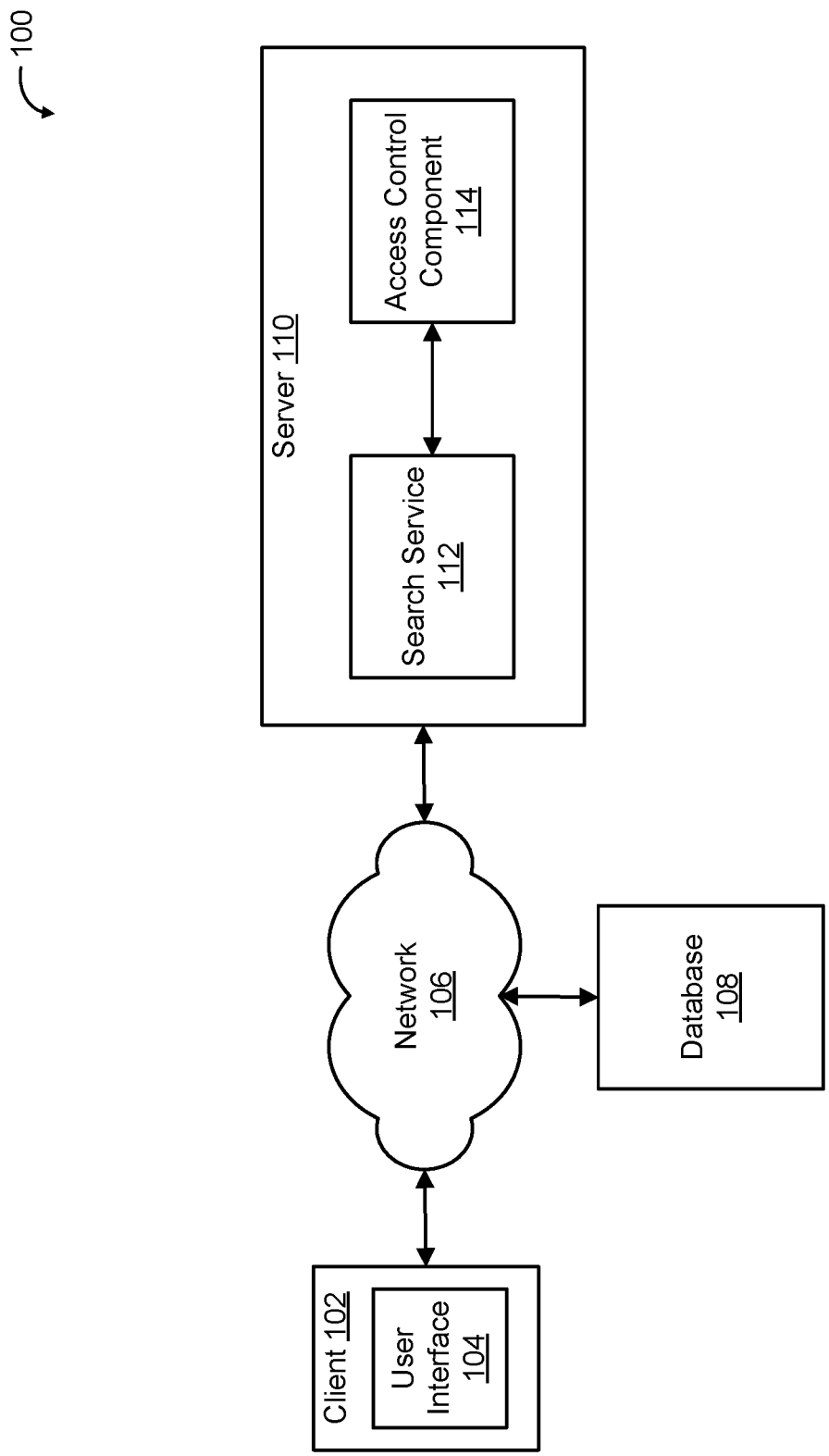
FIG. 1 is a block diagram illustrating an embodiment of a system for searching for information located in data records.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A search index is generated from one or more data records, wherein the one or more data records have contents in a plurality of different fields. Field information of the one or more data records is stored in the search index as specialized indexed elements, wherein the specialized indexed elements overlap with other indexed elements of the one or more data records. A search query is received from a user allowed to access only a portion of the plurality of different fields. The search query is processed within the portion of the plurality of different fields using the search index including the specialized indexed elements.

A technological benefit of the techniques disclosed herein is improved support for field level security constraints (also referred to herein as field level access control, field level restrictions, field restrictions, field access restrictions, etc.). The techniques disclosed herein cover searching across allowed and disallowed fields at query time by encoding information about fields into a search index (also referred to herein simply as an index) so that the information about fields can be efficiently and securely retrieved. An advantage of such an approach is that a search engine can determine a user's allowed access to content through the search index. For example, external users can be restricted from viewing a "work notes" field while employees can be granted access.

The techniques disclosed herein address a major technical challenge resulting from search engine access control being typically implemented at a document level and not at a field level (with fields being sub-document level data structures). While it is theoretically possible to direct a search engine to search each field separately, such an approach is inefficient if there is a large number of fields. Other approaches that involve grouping fields and/or other data structures to align with access restrictions (e.g., pre-arranging the fields and/or other data structures prior to executing searches) are also problematic. For example, if access restrictions change (e.g., if access restrictions depend on certain conditions and these conditions change), the fields and/or other data structures would need to be re-grouped and updated to align with the changed access restrictions, which would require computationally burdensome re-indexing of search engine indexes.

FIG. 1 is a block diagram illustrating an embodiment of a system for searching for information located in data records. In the example shown, system 100 includes client 102, network 106, database 108, and server 110. In various embodiments, client 102 is a computer or other hardware device that a user utilizes to search for information located in data records. Examples of client hardware devices include desktop computers, laptop computers, tablets, smartphones, and other devices. In the example illustrated, client 102 includes user interface 104. In various embodiments, user interface 104 is a software user interface through which the user submits search queries and views search query results. The software user interface may be a web portal, internal network portal, or other portal that allows users to transmit and receive data. Other examples of software include browsers, mobile apps, etc.

In the example illustrated, client 102 is communicatively connected to network 106. Search queries may be transmitted to and responses received from server 110 using network 106. Examples of network 106 include one or more of the following: a direct or indirect physical communication connection, mobile communication network, Internet, intranet, Local Area Network, Wide Area Network, Storage Area Network, and any other form of connecting two or more systems, components, or storage devices together. In the example illustrated, database 108 is also communicatively connected to network 106. In some embodiments, information located in data records stored in database 108 are searched. In various embodiments, database 108 is comprised of data files and/or other structured sets of data held in one or more computers and/or storage devices. Examples of storage devices include hard disk drives and solid-state drives. The form and structure of data stored in database 108 and subject to search queries submitted by client 102 are described in further detail herein.

In various embodiments, server 110 is a computer or other hardware component that provides search functionality. In various embodiments, server 110 includes a computer information retrieval system (e.g., a search service) that is designed to assist in locating information stored on computer systems. In the example illustrated, search service 112 of server 110 is a software component that responds to user search queries submitted by client 102 and searches for requested information (e.g., information stored in database 108). In various embodiments, search service 112 searches for information located in data records of database 108. In various embodiments, database 108 comprises data files, which are comprised of data records. In various embodiments, data records are comprised of a plurality of uniquely named components called data fields (also referred to herein as source fields or simply as fields). Documents can be data records (e.g., see FIG. 2 for an example set of documents). For example, a text document can be a data record. Examples of fields within the text document include a title field, a description field, an author field, a body field, and so forth. In various embodiments, search service 112 comprises a search engine that has the functionality to create an index of items (e.g., words) in data records stored in database 108. Search service 112 is then able to search for the items by looking them up in the created index.

In some embodiments, search service 112 includes a text search engine. In various embodiments, the text search engine searches an index of data records (e.g., documents) by searching for strings (e.g., searching for any document that includes the words "Dow Jones"). Search service 112 supports text indexing and searching. With respect to the "Dow Jones" example, search service 112 could create lists for terms (e.g., words) to be searched before they are searched. In this example, lists for the words "Dow" and "Jones" or the full term "Dow Jones" could exist. In various embodiments, the lists indicate locations where search terms can be found. For each list, a set of entries (also known as postings) exist. For example, for the word "Dow", each entry/posting may include a document identification (ID) and/or other positional information (describing position within the document) indicating where that particular instance of the word "Dow" is located. Thus, when a user searches for "Dow Jones", the text search engine can look up the postings for "Dow" and the postings for "Jones" and return the document IDs that are common to both terms.

The same position within a document may be referenced by postings from several terms. These terms can thus have the same start and end positions (start and end may also be represented as start and length). This can be used to represent synonyms (e.g., if document 100 has "Dow" in position 20 and "Jones" in position 21, it might also have "DJ" in positions 20-21). A combination of document ID, start position, and end position is commonly known as a "span". In various embodiments, search service 112 supports querying with span constraints. An example of a search query with span constraints is searching for "Dow" and "Jones" appearing next to or within another specified distance of each other (e.g., within two words of each other). Such span constraints are supported because start and end positions are known.

In various embodiments, there exist various restrictions on access to data (e.g., data stored in database 108). In various embodiments, these access restrictions are mirrored in a search index on which a text search engine operates and are enforced by the text search engine. In various embodiments, restrictions at a sub-document level are enforced. In particular, in various embodiments, field access restrictions are enforced by search service 112. In the example illustrated, access control component 114 provides access control information, including field access restrictions, to search service 112. In various embodiments, access component 114 is a software component that provides field access restrictions to search service 112 upon request and/or as a background service. Access control component 114 may include storage on server 110 for access control information (e.g., an access control information database). The access control information may also be stored on a separate server that is communicatively connected to server 110.

Each field access restriction applies to a particular field and imposes a restriction that can depend on user context along with values of other fields. Field restrictions that depend on information that is not statically known prior to search execution (e.g., values of other fields) are referred to herein as conditional restrictions. An example of a conditional restriction, which can be formulated as a rule/policy is as follows: if the user type is "non-employee", access to the contents of the "notes" field of a document is allowed only if the "status" field of the document is "public", but if the user type is "employee", access to the contents of the "notes" field is allowed regardless of the value of the "status" field. Allowed access in a search context means that a string match is allowed (e.g., strings in the "notes" field are allowed to be matched in determining search results). As the above example illustrates, it can be the case that it is not known based only on user type alone whether the user is allowed access to the contents of a particular field.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients and/or databases may exist. The number of components and the connections shown in FIG. 1 are merely illustrative. Components not shown in FIG. 1 may also exist.

Figure 2:
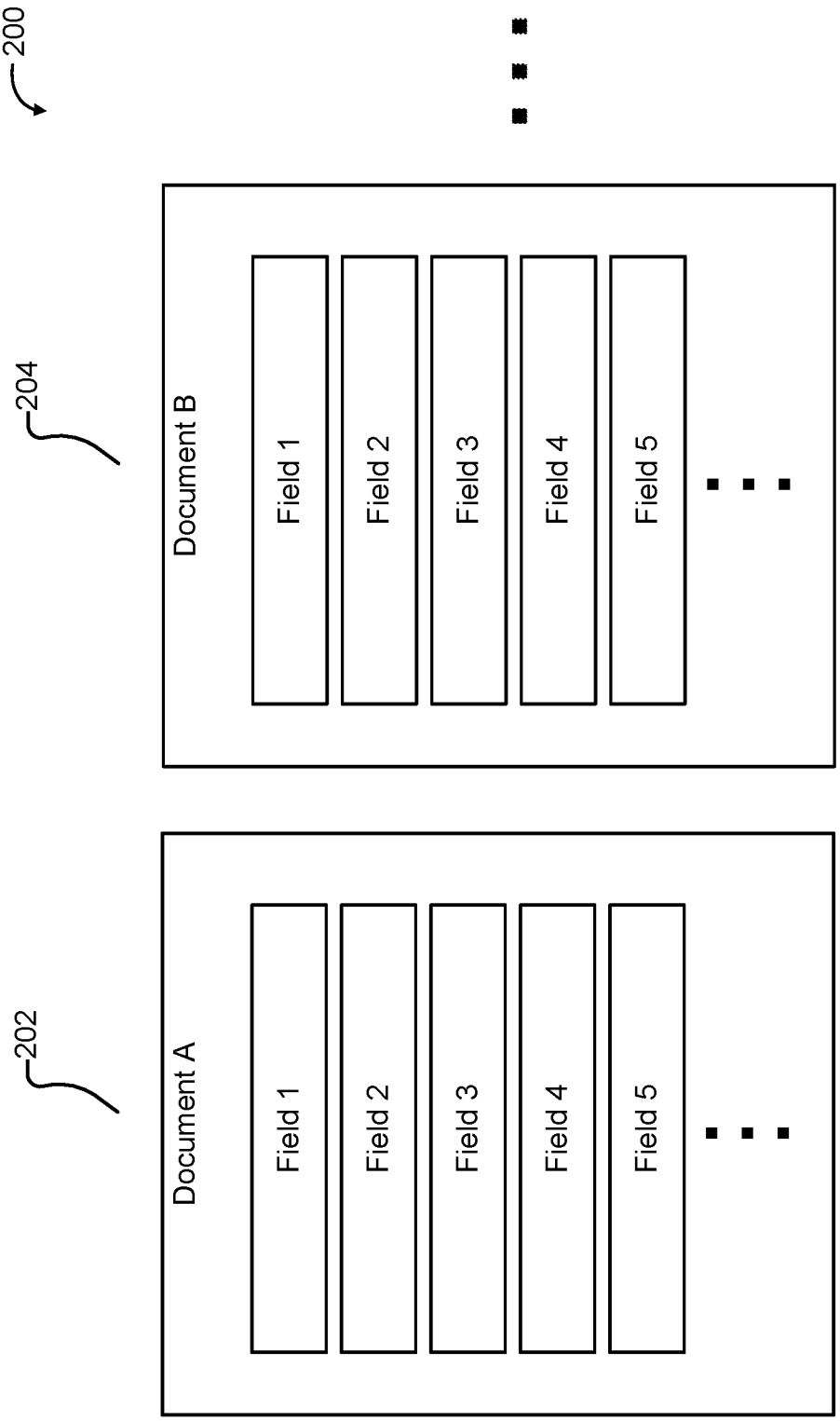
FIG. 2 is a diagram illustrating an example of a set of documents with data fields.

FIG. 2 is a diagram illustrating an example of a set of documents with data fields. In some embodiments, set of documents 200 is stored in database 108 of FIG. 1. Document A 202 and document B 204 are examples of data records that may be stored in database 108 of FIG. 1 and whose contents are searched by search service 112 of FIG. 1. In the example shown, each document comprises a plurality of fields. The number of documents and fields shown is merely illustrative. More documents and fields can exist. In some embodiments, the documents are text documents. Examples of fields within text documents include a title field, a description field, an author field, a body field, a notes field, a work notes field, a comments field, etc.

In various embodiments, set of documents 200 is indexed by a search service (e.g., search service 112 of FIG. 1). In various embodiments, each field has a separate access control rule attached to it and evaluation of each access control rule can depend on the values of other fields in the same document. Field 1, field 2, field 3, and so forth may be subject to different access restrictions (e.g., different conditional restrictions). It is also possible for certain fields to have access control restrictions that depend only on a user type or have no access control restrictions at all. Different fields can have different access control restrictions and access evaluation can depend on both the authorization of the user as well as other fields in a document. In many search engines, indexing occurs at a document granularity level; thus, access control would depend on whether a user has access to a document or not. A technological problem addressed by the techniques disclosed herein is providing access control at a sub-document/field level. Stated alternatively, when a term is searched for, it needs to be matched on a field level basis instead of on a document level basis. Field level matching may include conditional restrictions.

Figure 3:
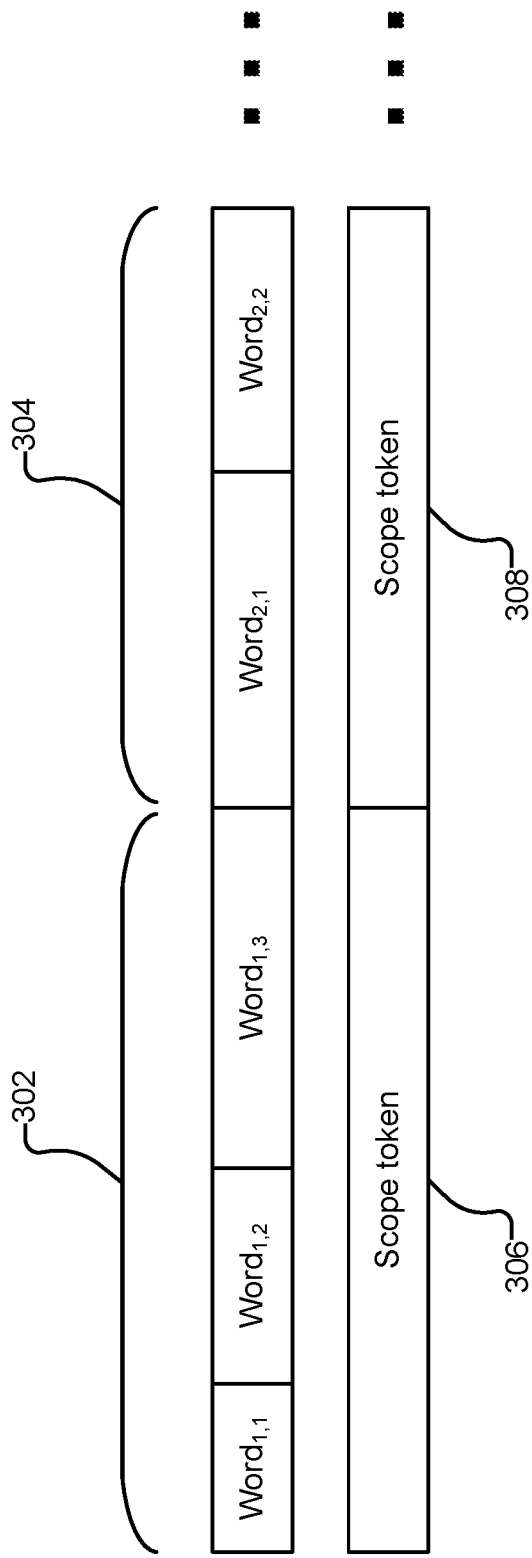
FIG. 3 is a diagram illustrating an example format for information stored in a search index.

In various embodiments, in order to provide field level access control, specialized indexed elements are used. These specialized indexed elements can be regarded as belonging to a new token class to represent fields. As used herein, these specialized indexed elements are also referred to as scope tokens. In various embodiments, scope tokens overlap with other indexed elements. In various embodiments, the other indexed elements are word tokens. Thus, in various embodiments, scope tokens overlap with word tokens in a search index generated by a search engine. FIG. 3 illustrates an example of this overlap. In the example shown in FIG. 3, index field 302 (comprising word tokens $word_{1,1}$, $word_{1,2}$, and $word_{1,3}$) and index field 304 (comprising word tokens $word_{2,1}$ and $word_{2,2}$) are shown. In the context of FIG. 3, the fields shown are fields in an index that is created and searched. In some embodiments, index field 302 and index field 304 are generated based on fields in a document in set of documents 200 of FIG. 2 and include word tokens. In some embodiments, the word tokens are English words, words in another language, other alphanumeric strings, and so forth. In the example shown in FIG. 3, scope tokens 306 and 308 overlap with index fields 302 and 304, respectively. In various embodiments, each scope token includes position information and field identification information. For example, in some embodiments, scope token 306 includes a start position (within a particular document) for $word_{1,1}$, an end position (in that particular document) for $word_{1,3}$, and a field ID for index field 302. It is also possible for the scope token to utilize a start position and a length (the length being the length from the start of $word_{1,1}$ to the end of $word_{1,3}$) to capture the same position information as a start position and an end position. In various embodiments, the field ID is a unique ID, such as a globally unique ID (GUID). As described in further detail herein, an effect of each scope token including a field ID is that because each scope token overlaps with a corresponding field (e.g., scope token 306 overlaps with index field 302), search terms found in an index can be associated with field IDs (e.g., to determine whether the found term came from particular data fields in FIG. 2) and the field IDs can be used to apply different field access restrictions.

Tokens can be indexed along with "spans" where a token's span refers to the start and end position of the token (or equivalently, the start and length of the token). A special "scope" token is used to represent a field from the source record or source document or other source data being indexed. Thus, an aggregated "content" index field that includes source field 1 followed by source field 2 followed by source field 3, etc., can be created and the start/end positions of source field 1 can be overlayed by a scope token with appropriate start/end positions, the start/end positions of source field 2 can be overlayed by another scope token with appropriate start/end positions, and so forth. With this representation (see FIG. 3 for a diagrammatic example), scoping can be implemented with a span query searching just one field. A different scope token for each field name results in multiple span queries referencing the scope tokens. In various embodiments, span entries in postings are modified with an additional piece of metadata representing field name. In general, the additional piece of metadata can represent other elements associated with field access restrictions (e.g., might represent a set of field names or even a hierarchy of field names). In various embodiments, the underlying implementation of any term-based query in a search engine traverses postings lists (which include the spans) for that term. With the additional piece of metadata, instead of representing each source field as a separate index field which would require traversing a separate postings list for each individual source field, as index fields are stored with separate posting lists, there is only one postings list as only one index field can be used to represent multiple source fields. As the search engine reads the spans, this additional piece of metadata in the span permits evaluation of the relevant source field access restriction. This organization allows for sequentially reading from one postings list instead of separately reading from potentially a very large number of postings lists, resulting in a significant computational gain. Field access restrictions can be efficiently supported without re-indexing content upon field access restriction rule updates. In this example, one "content" index field representing one or more source fields is described. However, there may be use cases where there are multiple such index fields, or combinations of such index fields and more traditional index fields corresponding to one source field. The combination required is dictated by the use cases supported.

Various search engines (e.g., text search engines) support utilization of positional information associated with search terms (e.g., word tokens). This search engine capability, which is native to various search engines, can be exploited by defining a special token type called a scope that is utilized to represent a field. As shown in FIG. 3, a document can be represented as a concatenation of words in a set of fields and it is possible to overlay on top of this representation a set of scope tokens, wherein the first scope token gives the locations (e.g., offsets) of the beginning of the first word and end of the last word in field 1, the second scope token gives the locations of the beginning of the first word and end of the last word in field 2, and so forth. As described above, because search engines support a same position within a document being referenced by postings from several terms (see Dow Jones example above), it is possible to overlay specialized indexed elements (the scope tokens) over word tokens and have the search engines detect both the word tokens and the scope tokens. In various embodiments, the scope tokens encode field information (in particular, field identification information) that is detected by a search engine and utilized to apply field level access control. Applying field level access control can be performed by constructing Boolean expressions around scope tokens. In various embodiments, positional information for scope tokens (indicating which word tokens and thus fields the scope tokens overlap) is inherently supported by search engines. In addition to positional information, an additional piece of data (also referred to herein as an additional piece of metadata, a third metadata (in addition to start/end positions), etc.) is utilized for field identification. With this additional piece of data, a search engine can evaluate Boolean expressions related to fields and a filter that indicates to the search engine which fields are restricted can be constructed to map field restrictions to fields during execution of search queries. In general, document level access restrictions may also apply. It is possible for document level access restrictions to be applicable in parallel with the field level access restrictions described herein.

Figure 4:
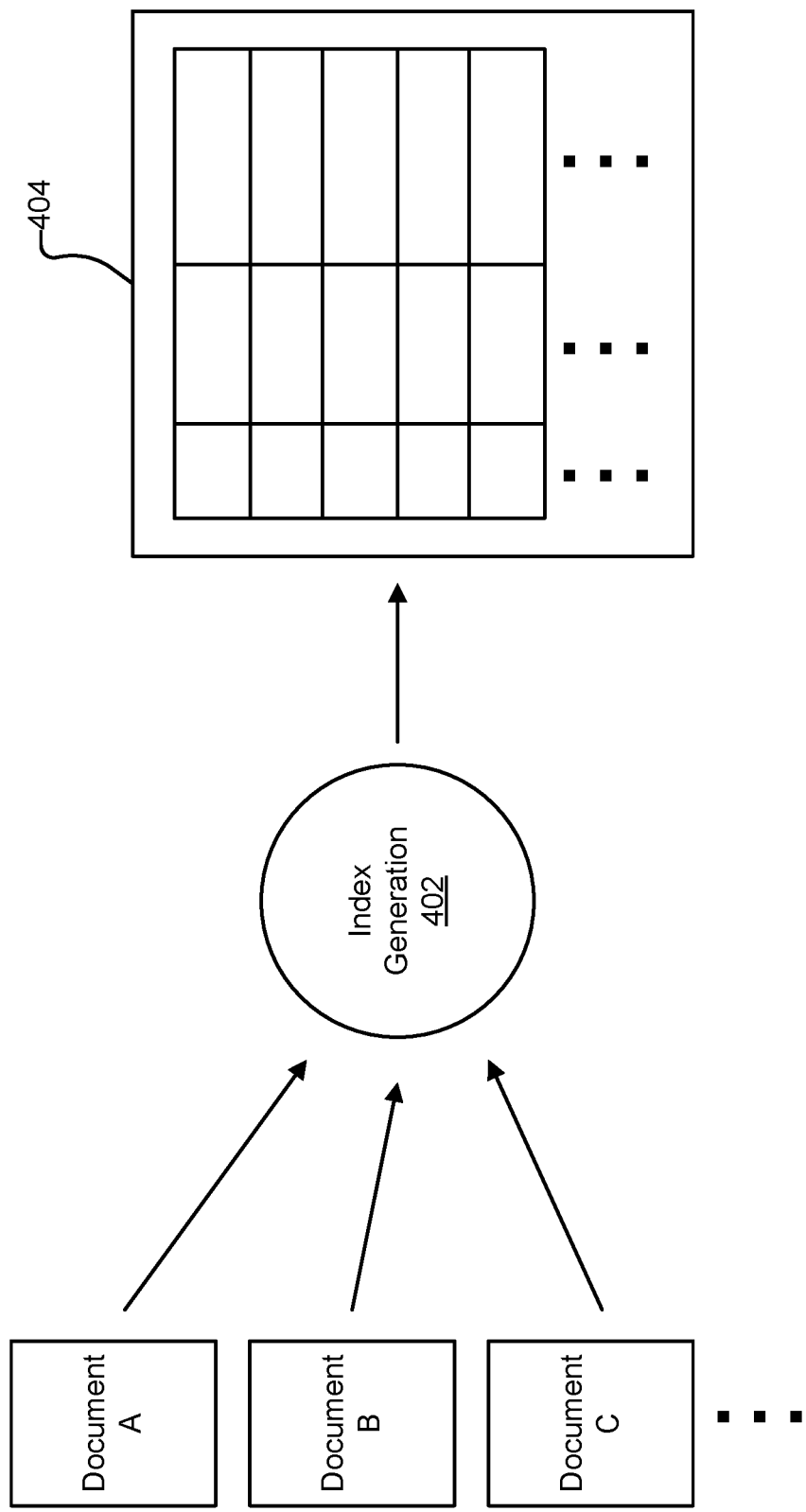
FIG. 4 is a diagram illustrating an example of generation of a search index.

In some embodiments, each scope token is represented to a search engine as a special word that the search engine can detect, wherein the special word is not any normal word that can be a word token. In this manner, the search engine can be directed to access the field information encoded in each scope token by being provided with a Boolean search expression that includes the scope token (e.g., adding a logical AND for the scope token). In various embodiments, the special word is a single, specific special word (not recognized as any normal word token that can be searched for) that is utilized (same word) for each scope token. In various embodiments, the search engine retrieves a postings list for each term (e.g., word) searched for in a search query plus and additional postings list for scopes. A posting refers to an information item associated with an instance of a searched item being found, wherein the information item includes which document the search item was found in and also, typically, the position within the document. A postings list refers to a list of all postings for the searched item. In various embodiments, posting lists are retrieved by the search engine from an inverted index. FIG. 4 illustrates an example of an inverted index generated from various documents. In the example shown, index generation 402 ingests various documents and generates inverted index 404. In some embodiments, index generation 402 comprises software code of search service 112 of FIG. 1. Inverted index 404 (also known as an inverted file) is a dictionary of terms from the various documents ingested by index generation 402 in which each term is associated with a postings list as well as, typically, an ID for the term. In various embodiments, retrieving a postings list for a term concomitantly returns a corresponding scope postings list that is utilized in a one-to-one correspondence to filter out restricted field level results. Thus, search engine results are filtered based on scope metadata at query time.

The following example is illustrative. Suppose, the terms "good" and "morning" are searched for (e.g., as requested by client 102 of FIG. 1 and searched by search service 112 of FIG. 1). The search query can also include various span constraints (e.g., "good" and "morning" must be in the same field, within a specified number of words or characters of each other, etc.). In various embodiments, a postings list for "good" and a postings list for "morning" already exist (e.g., created by search service 112 of FIG. 1). In various embodiments, the postings list for "good" and the postings list for "morning" are retrieved by a search engine. In various embodiments, the postings for "good" and "morning" are sorted by document ID and by intra-document position. As an example, the search engine could find that "good" appears in locations 1, 10, and 20 and "morning" appears in locations 11, 21, and 30 (with a first field laid out as locations 0-19 and a second field laid out as locations 20-39), in which case both fields are hits without considering field level restrictions. Field level restrictions are considered as additional span constraints. Stated alternatively, field level restrictions are compiled into each span query. For example, if the first field is a field whose access is restricted, then only the location 20/21 "good morning" would be reported as a hit. As another example, suppose the following string: "The Dow Jones Industrial Average rose over . . . " and suppose that "DJIA" is a named entity indexed for "Dow Jones Industrial Average". Then, the following would be stored in an index: "The" at location 0, "Dow" at location 1, "Jones" at location 2, "Industrial" at location 3, "Average" at location 4, "DJIA" at locations 1-4, "rose" at location 5, and "over" at location 6.

FIG. 3 is a diagram illustrating an example format for information stored in a search index. Further description of FIG. 3 is provided above in the description of FIG. 2.

FIG. 4 is a diagram illustrating an example of generation of a search index. Further description of FIG. 4 is provided above in the description of FIG. 2.

Figure 5:
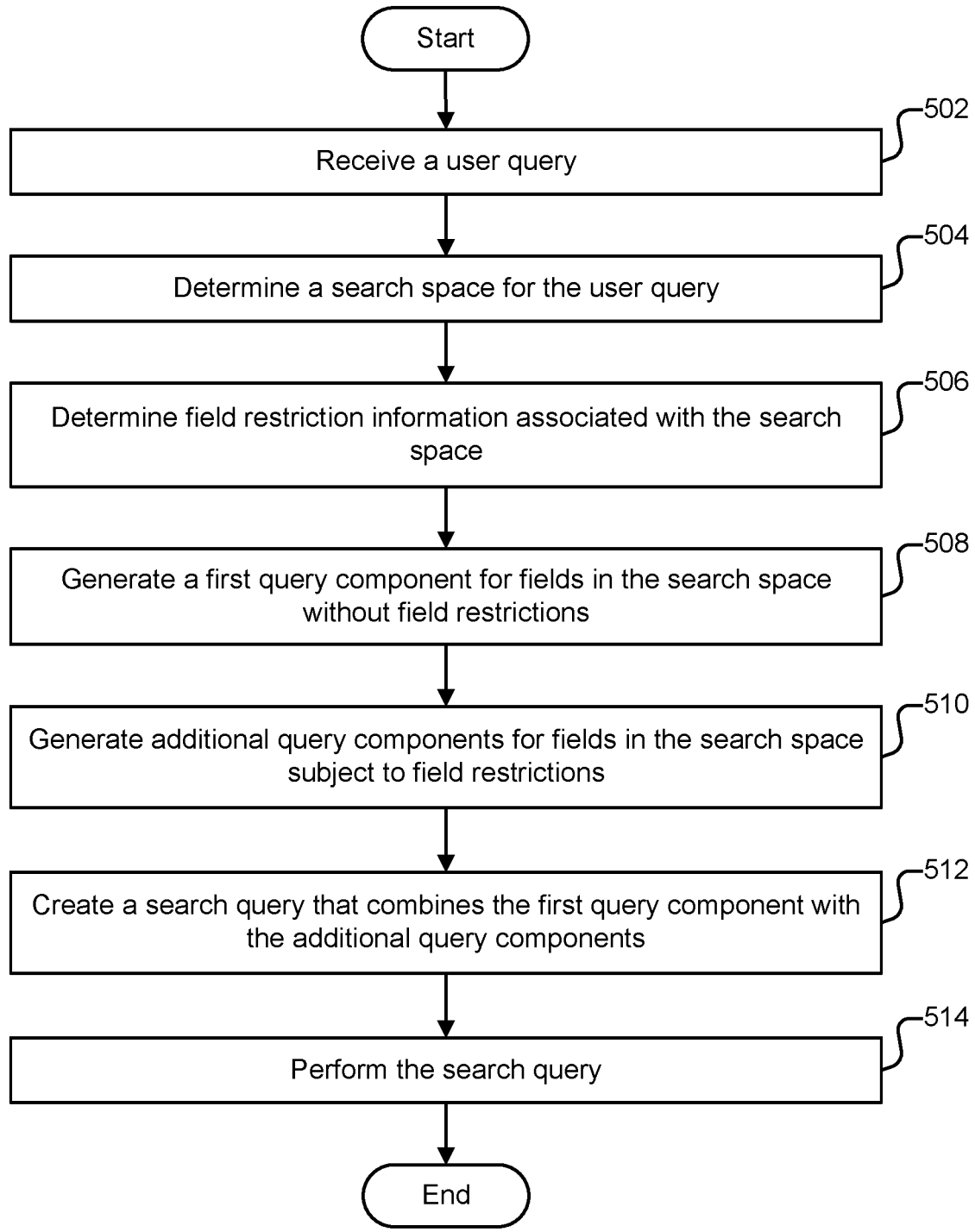
FIG. 5 is a flow chart illustrating an embodiment of a process for converting a user query to a search engine query incorporating field level user access control.

FIG. 5 is a flow chart illustrating an embodiment of a process for converting a user query to a search engine query incorporating field level user access control. In some embodiments, the process of FIG. 5 is performed by search service 112 of FIG. 1.

At 502, a user query is received. In some embodiments, the user query is received from client 102 of FIG. 1. The user query includes terms to be searched. For example, the terms "good" and "morning" could be included in the user query. In some embodiments, a user types these terms into a search box. In some embodiments, a user interface (e.g., user interface 104 of FIG. 1) is utilized to specify span constraints (e.g., to specify that "good" and "morning" must appear within a certain number of words of each other).

At 504, a search space for the user query is determined. In some embodiments, the search space defines a set of data records and/or a data storage location (e.g., database 108 of FIG. 1) over which to conduct a search associated with the user query. In some embodiments, the search space defines a set of documents (e.g., set of documents 200 of FIG. 2) to which the user query is applicable. In some embodiments, the search space includes search restrictions that are known based on search session information. For example, based on user type, which is part of the search session information, certain documents/sets of documents may be designated as restricted (e.g., certain documents restricted if the user is a member of the public as opposed to an internal member of an organization with broader access privileges). In some embodiments, access control component 114 of FIG. 1 provides this document level access control information.

At 506, field restriction information associated with the search space is determined. In some embodiments, rules/policies for field restrictions are retrieved from access control component 114 of FIG. 1. In various embodiments, each field restriction rule includes a field ID as a string and a logical condition. In various embodiments, the field ID is a string that uniquely identifies a field and the condition is a query condition under which the field in a specific record is allowed to be accessed. In various embodiments, each query condition is rewritten from a relational database query condition to a search engine query condition such that a search request, which includes items to be searched for and a set of field restrictions, can be issued to a search engine. In some embodiments, the search engine hashes retrieved field IDs in field restriction rules (e.g., provided by access control component 114 of FIG. 1) to field IDs associated with scope tokens (e.g., using a hashing algorithm such as MD5). Stated alternatively and generally, in various embodiments, access restrictions are converted into an underlying span query. As described in further detail below, in various embodiments, the span query includes a normal query component without field restrictions and one or more additional query components with field restrictions. Field level security constraints are converted to span queries because a span maps to a field.

The following example is illustrative. Suppose that a search space has been defined for a user based on credentials of the user (e.g., a set of documents can be accessed because the user is a customer with specified privileges). Suppose that documents in the search space are comprised of a plurality of fields. Suppose that the user is unconditionally allowed access to field 1 (e.g., a title field or main text field, etc.). This would be part of the field restriction information associated with field 1 retrieved and determined. Further, suppose that also retrieved and determined is a field access restriction rule for field 2 that indicates that the user is allowed to access field 2 (e.g., a notes field) of any particular document only if field 3 of that particular document has a value equal to "published". Field 1 in this example is a field with no field restrictions. Field 2 is in this example is a field with field restrictions. Furthermore, the field 2 field restrictions are an example of field restrictions that cannot be resolved based on session data alone, but rather, are dependent on data within documents and must be resolved as matching within postings lists occurs. Stated alternatively, field 2 in this example is illustrative of a field with a conditional field restriction. Because, as disclosed herein, field information is encoded into postings (e.g., in an inverted index), a search engine is able to natively interpret and process conditional field restrictions, which can be expressed as Boolean expressions native to the search engine.

At 508, a first query component for fields in the search space without field restrictions is generated. In various embodiments, the first query component covers searching for all documents that match the user query outside of a set of fields with field restrictions. The first query component covers fields whose accessibility does not need to be resolved during search execution. The first query component covers fields including field 1 in the example given above.

At 510, additional query components for fields in the search space subject to field restrictions are generated. An additional query component is generated for each unique condition in the field restrictions. These unique conditions require a match of the user query and a separate condition being met. Field 2 in the example given above (in which field 2 is accessible only if field 3 in the same document has a specified value) is an example of a field for which an additional query component is generated.

Figure 6:
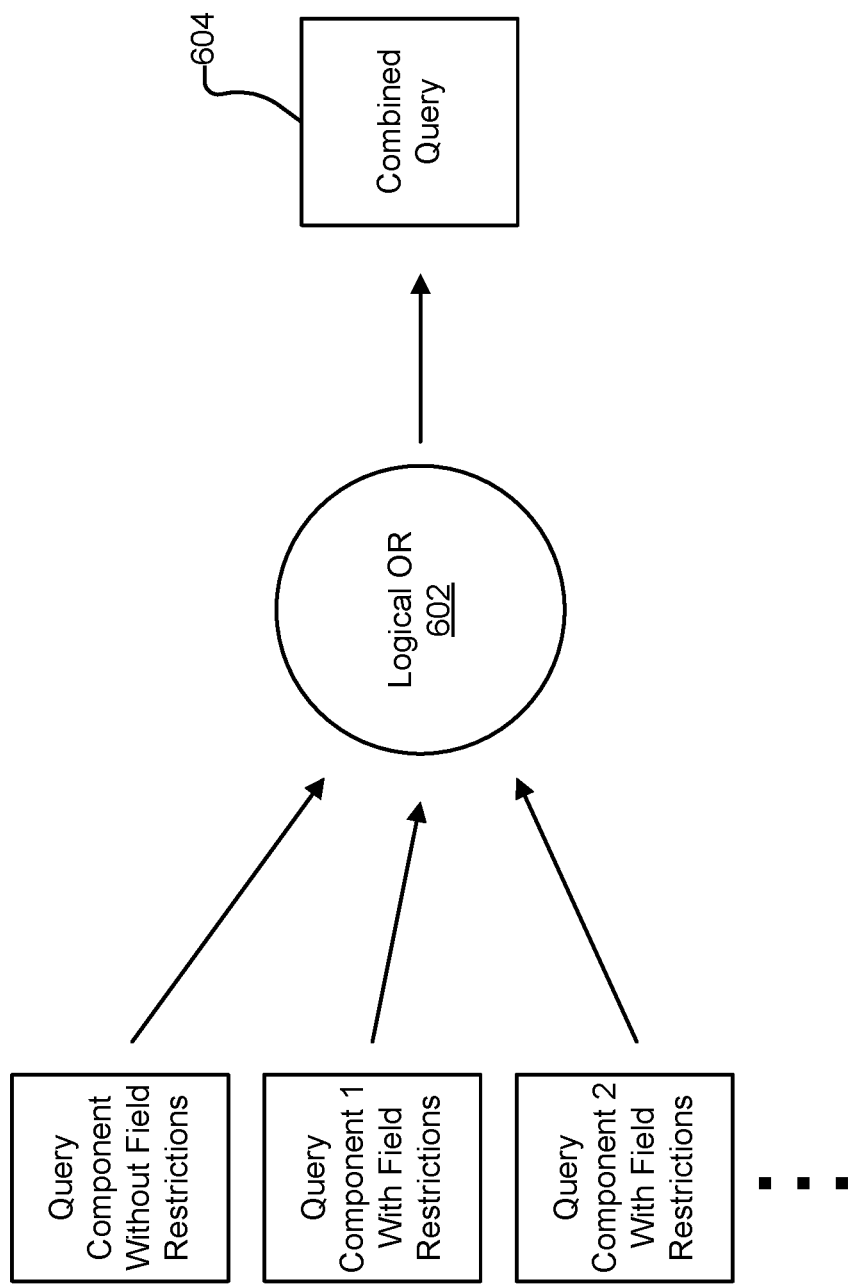
FIG. 6 is a diagram illustrating an example of combining a query component without field restrictions with query components with field restrictions.

At 512, a search query that combines the first query component and the additional query components is created. In various embodiments, a search engine processes the user query and the field restrictions to create a search query that returns documents adhering to the field restrictions. In some embodiments, the actual combination of the first query component and the additional query components utilizes an OR query structure. An example of such a structure is illustrated in FIG. 6. In the example shown in FIG. 6, logical OR 602 is applied to multiple incoming clauses (components) to generate combined query 604. In some embodiments, each query component is executed by the search engine and then a logical OR is applied to determine final results to return to a user. The first query component results in a set of matches that matches everything in the user query that the user is allowed to access unconditionally (in fields with no field restrictions, e.g., field 1 in the example given above). Every field that has a distinct condition is associated with a set of matches in which searching in that field occurs under the distinct condition (e.g., field 2 in the example given above). Field information encoded in scope tokens, including field ID (the third metadata referred to previously), is utilized to determine identities of fields. In this manner, the search engine is able to match the user query (search for search terms) in specific fields and determine whether specific distinct conditions apply (e.g., whether values in other specified fields equal specified values).

At 514, the search query is performed. In various embodiments, the search query (a combination of query components) is submitted to a search engine. In some embodiments, search service 112 of FIG. 1 performs the search query.

FIG. 6 is a diagram illustrating an example of combining a query component without field restrictions with query components with field restrictions. Further description of FIG. 6 is provided above in the description of FIG. 5.

Figure 7:
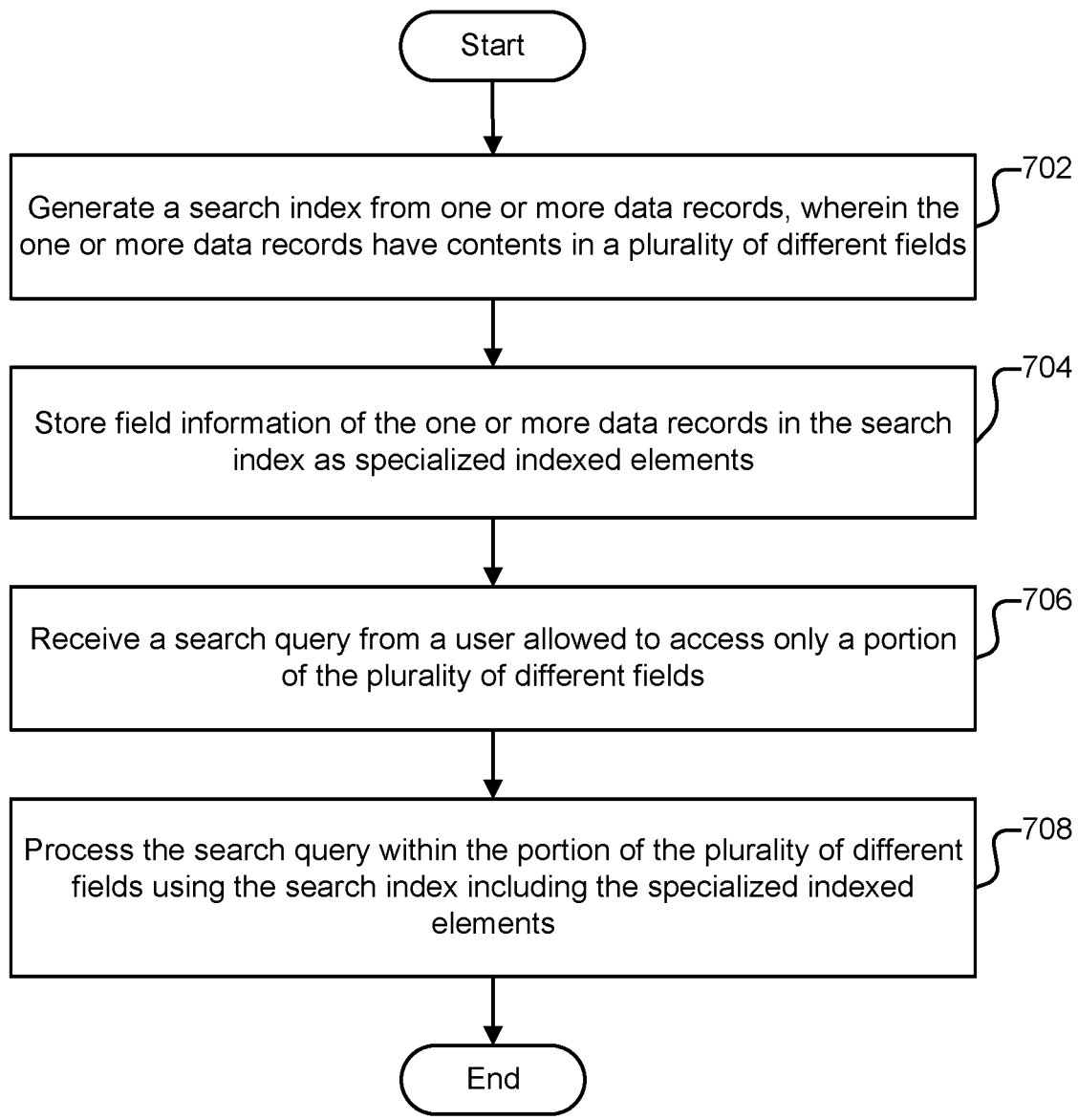
FIG. 7 is a flow chart illustrating an embodiment of a process for performing a search query received from a user that is allowed to access only certain fields.

FIG. 7 is a flow chart illustrating an embodiment of a process for performing a search query received from a user that is allowed to access only certain fields. In some embodiments, the process of FIG. 7 is performed by search service 112 of FIG. 1.

At 702, a search index is generated from one or more data records, wherein the one or more data records have contents in a plurality of different fields. In some embodiments, the search index that is generated is inverted index 404 of FIG. 4. In some embodiments, the data records are documents. In some embodiments, the data records are stored in database 108 of FIG. 1. In some embodiments, the data records comprise set of documents 200 of FIG. 2. Terms that can be matched in the search query reside in the plurality of different fields (e.g., fields shown in FIG. 2). In various embodiments, the search index is generated by search service 112 of FIG. 1 before the search query is performed. In various embodiments, the search query is performed by detecting search terms (e.g., words) in the search index (e.g., in postings lists in the search index).

At 704, field information of the one or more data records in the search index are stored as specialized indexed elements. The specialized indexed elements overlap with other indexed elements of the one or more data records. For example, in various embodiments, the specialized indexed elements overlap with word tokens. In some embodiments, the specialized indexed elements are scope tokens. In various embodiments, the scope tokens encode field ID information such that a search engine is able to identify in which field word tokens are located based on traversing the search index. In some embodiments, the field information includes positional information that the search index reads to identify a span of each scope token. In various embodiments, the span of the scope token overlaps with the span of word tokens comprising a corresponding field. For example, in the example shown in FIG. 3, each scope token overlaps with a distinct field comprising word tokens. In some embodiments, each scope token includes the field ID of the field comprised of the word tokens and positional information, such as a starting position of a first word in the field and an ending position of a last word in the field (or equivalently, the starting position of the first word and a length from the starting position of the first word to the ending position of the last word).

At 706, a search query is received from a user allowed to access only a portion of the plurality of different fields. In some embodiments, the search query is received from client 102 of FIG. 1 via network 106 of FIG. 1. In various embodiments, the portion of the plurality of different fields that the user is allowed to access is governed by field access control restrictions. In some embodiments, the field access control restrictions include conditional restrictions. For example, the user may be allowed to access a first specified field in a document only if a second specified field in the document has a specific value. In some embodiments, the field access control restrictions are provided by access control component 114 of FIG. 1.

At 708, the search query is processed within the portion of the plurality of different fields using the search index including the specialized indexed elements. In some embodiments, the search query includes multiple components. For example, the search query may include a component associated with fields without field restrictions and a component for each field with a unique/distinct field restriction condition. In some embodiments, the multiple components are combined in an OR query (e.g., see FIG. 6). As described herein, the search query is able to be processed on a field-by-field basis because the specialized indexed elements store field information, including field information identifying field IDs and positional information of fields with respect to word tokens comprising the fields.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   generating a search index from one or more data records, wherein the one or more data records have contents in a plurality of different fields;
   storing field information of the one or more data records in the search index as specialized indexed elements, wherein the specialized indexed elements overlap with other indexed elements of the one or more data records, at least two different types of tokens including a specific field scope token of the specialized indexed elements and a specific word token of the other indexed elements are indexed in the same search index, and the specific field scope token and the specific word token both reference a same word position in the one or more data records;
   receiving a search query from a user allowed to access only a portion of the plurality of different fields; and
   processing the search query within the portion of the plurality of different fields using the search index including the specialized indexed elements.

2. The method of claim 1, wherein the search index is an inverted index.

3. The method of claim 2, wherein the inverted index includes postings lists comprising positional information identifying locations within the one or more data records of the contents in the different fields.

4. The method of claim 1, wherein the one or more data records include text documents.

5. The method of claim 1, wherein the other indexed elements of the one or more data records include word tokens.

6. The method of claim 1, wherein the stored field information includes a field identifier associated with a collection of the other indexed elements.

7. The method of claim 1, wherein the stored field information includes positional information identifying locations within the one or more data records of the contents in the different fields.

8. The method of claim 1, wherein the stored field information includes a starting position of a first word token and an ending position of a last word token associated with a collection of the other indexed elements.

9. The method of claim 1, wherein generating the search index includes creating lists for unique word tokens in the one or more data records indicating corresponding locations within the one or more data records where the unique word tokens are located.

10. The method of claim 1, wherein storing field information includes storing a set of information comprising a field identifier and positional information indicating field start and end positions for each collection of word tokens comprising an instance of each field in the one or more data records.

11. The method of claim 1, wherein the user is unconditionally allowed to access a first field in the plurality of different fields and conditionally allowed to access a second field in the plurality of different fields.

12. The method of claim 1, wherein the user is allowed to access a first field of a document in response to a determination that a second field of the document has a specified value.

13. The method of claim 1, wherein processing the search query includes determining a set of documents the user is allowed to access based on an identity of the user.

14. The method of claim 1, wherein processing the search query includes retrieving a set of distinct field specific access control rules.

15. The method of claim 1, wherein processing the search query includes generating a query component associated with fields of the plurality of different fields that do not have field access restrictions for the user.

16. The method of claim 1, wherein processing the search query includes generating a query component associated with each field of the plurality of different fields that is subject to a distinct field restriction condition.

17. The method of claim 1, wherein processing the search query includes combining multiple query components in a logical OR query structure.

18. The method of claim 1, further comprising returning one or more search terms and corresponding document locations associated with the search query.

19. A system, comprising:
   one or more processors configured to:
      generate a search index from one or more data records, wherein the one or more data records have contents in a plurality of different fields;
      store field information of the one or more data records in the search index as specialized indexed elements, wherein the specialized indexed elements overlap with other indexed elements of the one or more data records, at least two different types of tokens including a specific field scope token of the specialized indexed elements and a specific word token of the other indexed elements are indexed in the same search index, and the specific field scope token and the specific word token both reference a same word position in the one or more data records;

receive a search query from a user allowed to access only a portion of the plurality of different fields; and process the search query within the portion of the plurality of different fields using the search index including the specialized indexed elements; and a memory coupled to at least one of the one or more processors and configured to provide at least one of the one or more processors with instructions.

20. A computer program product embodied in a non-transitory computer readable medium and comprising computer instructions for:

generating a search index from one or more data records, wherein the one or more data records have contents in a plurality of different fields;

storing field information of the one or more data records in the search index as specialized indexed elements, wherein the specialized indexed elements overlap with other indexed elements of the one or more data records, at least two different types of tokens including a specific field scope token of the specialized indexed elements and a specific word token of the other indexed elements are indexed in the same search index, and the specific field scope token and the specific word token both reference a same word position in the one or more data records;

receiving a search query from a user allowed to access only a portion of the plurality of different fields; and processing the search query within the portion of the plurality of different fields using the search index including the specialized indexed elements.

* * * * *